United States Patent [19]
Saxton

[11] 4,092,379
[45] May 30, 1978

[54] HEAT EXCHANGE SYSTEM

[76] Inventor: Forest J. Saxton, 1256 Mitzi Dr., Calistoga, Calif. 94515

[21] Appl. No.: 796,610

[22] Filed: May 13, 1977

[51] Int. Cl.² ............................................. B01F 3/04
[52] U.S. Cl. ..................................... 261/25; 261/89; 261/111; 261/DIG. 11
[58] Field of Search ....................... 261/25, 87, 89, 93, 261/111, DIG. 11, DIG. 77

[56] References Cited

U.S. PATENT DOCUMENTS

| | | | |
|---|---|---|---|
| 621,718 | 3/1899 | Seymour, Jr. | 261/25 X |
| 655,121 | 7/1900 | Schaffstadt | 261/25 X |
| 786,113 | 3/1905 | Grohman | 261/25 |
| 2,672,328 | 3/1954 | Mart et al. | 261/25 |
| 2,695,773 | 11/1954 | McGrath | 261/25 |
| 2,856,171 | 10/1958 | Otto | 261/111 |
| 3,206,177 | 9/1965 | Caplow | 261/89 X |
| 3,278,170 | 10/1966 | Moritz | 261/93 X |
| 3,533,607 | 10/1970 | Powers | 261/25 |

FOREIGN PATENT DOCUMENTS

| | | | |
|---|---|---|---|
| 57,852 | 10/1912 | Germany | 261/25 |
| 25,053 of | 1908 | United Kingdom | 261/25 |

*Primary Examiner*—Richard L. Chiesa
*Attorney, Agent, or Firm*—Melvin R. Stidham

[57] ABSTRACT

A heat exchange system and particularly a water cooling tower wherein water is sprayed from an upper level thereof to be cooled by rising air currents. A rotatable vertical shaft coaxial with the tower, has a multiplicity of arms or blades extending radially therefrom along the length thereof. The blades are of generally triangular cross-section, having upper surfaces which slope downward and lower surfaces which slope upward from leading portions thereof, whereby water drops falling from above and air currents rising from below both impart vectors of force toward the leading portion to rotate the shaft. An air impeller at the lower end of the shaft is thus rotated to augment air flow.

8 Claims, 3 Drawing Figures

HEAT EXCHANGE SYSTEM

BACKGROUND OF THE INVENTION

Industrial and power producing processes involving the use of water, often heat same to a level sufficient to cause considerable pollution if returned directly to the environment or to bring it to a temperature level excessive for the industrial process in which it is utilized. As a result, cooling towers have been provided wherein the water is cooled by transferring the heat therein to air, with which it is intimately mixed, and to a small percentage of the other droplets, which absorb it in vaporization. However, in present systems, this requires the use of extremely tall towers and/or the use of large motors and fans, with associated gearing in order to generate the necessary movement of air through the tower for efficient cooling. In either instance, the initial construction cost is extremely high and the continuing costs of maintenance, power consumption and replacement when motor driven air impellers are utilized are excessive. Further, the kinetic and thermal energy existing in the water falling through such towers is wasted.

OBJECTS OF THE INVENTION

It is an object of this invention to provide a water cooling system wherein motor driven fans or blowers are not required to generate the necessary air flow.

It is a further object of this invention to provide a water cooling tower wherein structural support for motors, fans and associated gearing is not required.

It is a further object of this invention to utilize the heated water dropping through a tower as a source of energies to drive cooling apparatus.

It is a further object of this invention to provide a water cooling tower wherein ambient cooling air is impelled inward and upward from the bottom and not merely exhausted from the top when heated.

It is a further object of this invention to provide a water cooling tower which is unobstructed by the placement of fans and driving means therefor in the air stream.

It is a further object of this invention to provide a water cooling tower which is relatively inexpensive to construct, operate and maintain.

Other objects and advantages of this invention will become apparent from the description to follow, particularly when read in conjunction with the accompanying drawing.

SUMMARY OF THE INVENTION

In carrying out this invention, I provide a relatively large cylindrical tower having rotatably mounted therein a vertical shaft. A multiplicity of radial arms or blades are staggered angularly along the length of the shaft. Each arm is generally triangular in cross section, with an upper surface which slopes downward from the leading edge thereof and a lower surface which slopes upward from the leading edge thereof and corresponding surfaces on all arms slope in the same direction. Accordingly, water drops falling down through the tower and air currents rising therethrough both impart vectors of force toward the leading edges of such surfaces, tending to drive the blades in the same direction to rotate the shaft. A continuous access opening is provided around the lower portion of the tower, and adjacent thereto, a suitable air impeller, such as a squirrel type fan, is secured onto the shaft to draw air in through such circumferential opening and force it up through the tower to augment the natural air currents therethrough. The rising air currents cool the water droplets and assist in rotating the radical blades as they impinge against their tapered under surfaces. Hot water is sprayed from an array of nozzles near the top of the tower extending over the cross-section thereof and water droplets falling therefrom strike the rotating blades, breaking the water into smaller droplets and, again, producing the abovedescribed rotation. The cooled water drops to a reservoir at the bottom of the tower.

DESCRIPTION OF A PREFERRED EMBODIMENT

Figure 1:
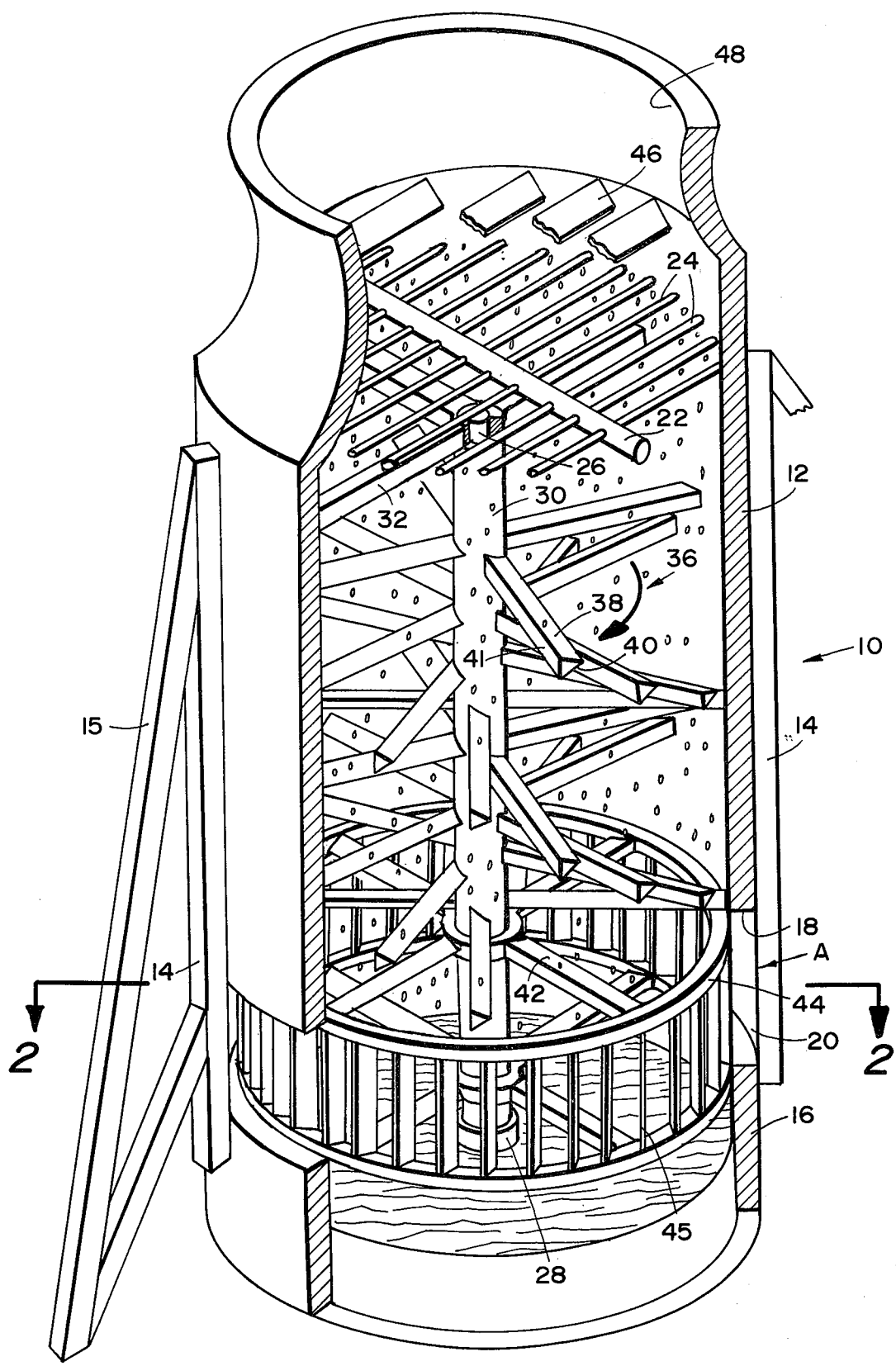
FIG. 1 is an isometric view broken away of a water cooling tower embodying features of this invention.

Referring now to FIGS. 1 with greater particularity, the water cooling system 10 of this invention includes a vertical, cylindrical chamber or tower 12 which may be supported on a plurality of columns 14 spaced around the tower 12. The columns in turn, may be supported on suitable framework 15 and on a basin or reservoir 16 to receive water droplets falling from the top of the tower 12. The base of the tower 18 is space above the top of the basin 16 to provide a virtually continuous opening 20 around the circumference of the tower for entry of air.

Heated water to be cooled is pumped by any suitable means (not shown) to a manifold 22 extending across the diameter of the tower, and in communication with the manifold is a plurality of lateral lengths or runs of tubing 24 having suitable perforations or nozzles therein whereby water is sprayed over most of the cross-sectional area of the tower 12.

Figure 3:
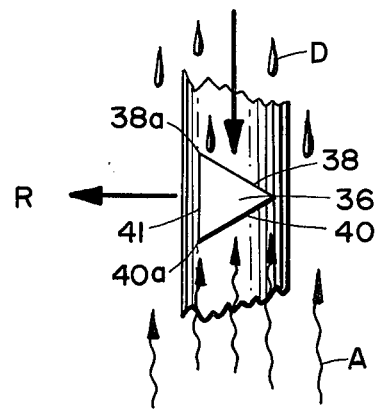
FIG. 3 is a more or less schematic view showing the action of water droplets and air currents on the radial blades utilized in the cooling tower.
Figure 2:
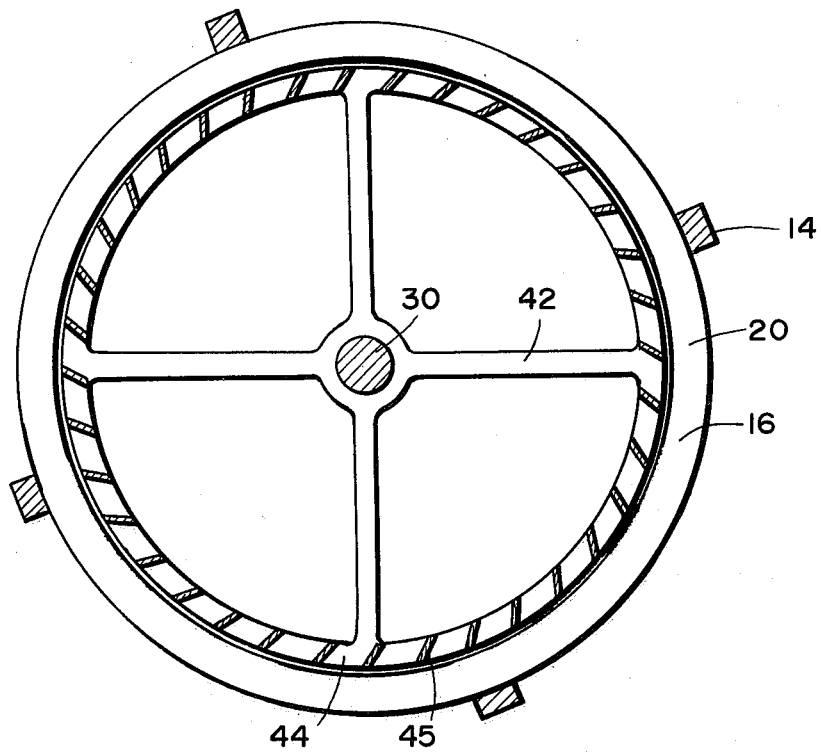
FIG. 2 is a horizontal section view taken along line 2—2 of FIG. 1.

Rotatably carried in upper and lower bearings 26 and 28, is a vertical shaft 30, the bearings 26 and 28 preferably being mounted co-axially of the tower 12 as by supporting them in radial beams 32 at the top and in a bearing block in the basin 16 at the bottom. Extending radially from the shaft 30 is a multiplicity of triangular arms or blades 36 which are spaced angularly around the shaft 30 and disposed along much of the length thereof, with the arms at various levels preferably being staggered as shown. As shown most clearly in FIG. 3, the arms 36 are generally triangular in cross-section with an upper surface 38 sloping downward from a leading edge 38a thereof and a lower surface 40 sloping upwardly from a leading edge thereof 40a. However, it may be found desirable to streamline the forward surface 41, or contour the surfaces 41, 38 and 40 for optimum thrust. In any event, such modifications are deemed to be within the scope of the term "generally triangular". Hence, with the generally triangular configuration, water droplets D falling, and currents of air A moving upwardly, both impart forward vectors of force which tend to drive the blades 36 in the direction of the arrow R. With all of the blades 36 being disposed in the same manner, the sum of these force vectors will tend to drive all blades in the same direction R and produce rotation of the shaft 30.

Secured onto the shaft 30 at the lower portion thereof are the radial spokes 42 of a suitable air impeller 44, such as the squirrel cage blower, with parallel vanes 45, illustrated. Hence, the rotation of the shaft produced by the blade reaction above described rotates the air impeller 44 to induce air flow in through the large windows 20 between the columns 14 and up the tower or chamber 12, eliminating the need for the usual blower-driven fans with associated gearing and drives. The result is a considerable saving in equipment and, of course, in construction costs which would otherwise be necessary to render the structure 10 capable of supporting such heavy equipment. Preferably the spokes 42 are also of generally triangular cross-section to conform with the blades 36.

Preferably carried at the top of the tower 12 is a plurality of vanes or baffles 46 on which any remaining entrained water may be settled out of the rising air which continues up through the stack 48.

In operation, water droplets are sprayed from the nozzles of the lateral tubes 24 and, as they impinge upon the radial glades 36, all with upper surfaces 38 sloping downward from the leading edges thereof, forward, rotating vectors of force are imparted to the blades. The blades thus produce rotation of the shaft 30 and with it, the air impeller 44, whereby the impeller blades 45 induce flow of air through the annular opening 14 and up the tower 12 to augment the natural draft. As the air acquired heat from the falling droplets, it increases in pressure, and therefore, moves at an increased velocity as it rises toward the stack 48. This upward movement of air impinges upon the sloping under surfaces 40 of the blades 36, again imparting a vector force in the direction of the arrow R augmenting the rotative forces induced by the falling water droplets.

In some installations, it may be found desirable to power the shaft 30 but in most cases this is not deemed necessary. In any case, this could readily be done with a prime mover mounted at the base of the tower 10 and would not require a mounting and reinforcing at the top of the tower. In addition, while I have shown a squirrel cage impeller 44, it is obvious that other types such as radially extending propeller blades may be employed. In such case, the window 20 may be disposed horizontally around the tower 10 as by making the basin 16 of larger diameter with its upper edge, and the lower edge 18 of the tower, at substantially the level of the fan.

While this invention has been described in conjunction with preferred embodiments thereof, it is obvious that other modifications and changes therein may be made by those skilled in the art without departing from the spirit and scope of this invention, as defined by the claims appended hereto.

What is claimed as invention is:

1. A liquid cooling heat transfer system comprising:
   a tower;
   means for spraying warm liquid in said tower from an upper level thereof;
   a vertical shaft rotatably mounted in said tower;
   a multiplicity of arms extending radially from said shaft over a considerable portion of the length thereof;
   said arms being of generally triangular cross-section wherein upper surfaces of said arms slope downward in the same direction from leading edges thereof so that impingement of falling water drops thereon impart force vectors toward said leading edges and lower surfaces of said arms slope upward from leading surfaces thereof so that impingement of rising air currents thereon impart force vectors toward said leading edges.
   an opening in said tower near the lower levels thereof; and
   air impelling means on said shaft to draw air into said tower through said opening.

2. The heat transfer system defined by claim 1 wherein:
   said arms are staggered angularly along the length of said shaft.

3. The heat transfer system defined by claim 1 wherein:
   a plurality of said radial arms are co-planar and angularly spaced.

4. The heat transfer system defined by claim 1 wherein:
   said spraying means comprises tubing extending in multiple lengths over a substantial cross-sectional area of said tower.

5. The heat transfer system defined by claim 1 including:
   a reservoir in said tower at the base thereof.

6. The heat transfer system defined by claim 1 wherein:
   said tower is of generally cylindrical configuration; and
   said shaft is coaxial with said tower.

7. The heat transfer system defined by claim 1 wherein:
   said air impelling means is situated at the lower level of said tower.

8. The heat transfer system defined by claim 7 wherein:
   said opening extends substantially around said tower.

* * * * *